United States Patent
Cataniag (10) Patent No.: US 12,464,600 B2
(45) Date of Patent: *Nov. 4, 2025

(54) TIMER FOR EMERGENCY TEXT MESSAGES

(71) Applicant: T-Mobile USA, Inc., Bellevue, WA (US)

(72) Inventor: Arnold F. Cataniag, Issaquah, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 505 days.

This patent is subject to a terminal disclaimer.

(21) Appl. No.: 17/858,386

(22) Filed: Jul. 6, 2022

(65) Prior Publication Data

US 2022/0346186 A1  Oct. 27, 2022

Related U.S. Application Data

(63) Continuation of application No. 17/024,132, filed on Sep. 17, 2020, now Pat. No. 11,399,409.

(51) Int. Cl.
*H04W 76/50* (2018.01)
*H04L 65/1104* (2022.01)
*H04W 76/38* (2018.01)

(52) U.S. Cl.
CPC ......... *H04W 76/50* (2018.02); *H04L 65/1104* (2022.05); *H04W 76/38* (2018.02)

(58) Field of Classification Search
CPC .... H04W 76/50; H04W 76/38; H04L 65/1006

USPC ...................................................... 455/404.1
See application file for complete search history.

(56) References Cited

U.S. PATENT DOCUMENTS

| 9,515,990 | B1 | 12/2016 | Bennett, III | |
|---|---|---|---|---|
| 11,399,409 | B2 | 7/2022 | Cataniag | |
| 2005/0043008 | A1* | 2/2005 | Hurita | H04W 4/90 455/404.1 |
| 2008/0198871 | A1 | 8/2008 | Shahidi | |
| 2015/0092533 | A1* | 4/2015 | Biage | H04W 4/90 370/216 |
| 2018/0263068 | A1* | 9/2018 | Chiang | H04L 67/14 |
| 2022/0086952 | A1 | 3/2022 | Cataniag | |

OTHER PUBLICATIONS

Office Action (Notice of Allowance and Fees Due (PTOL-85)) dated Apr. 1, 2022 for U.S. Appl. No. 17/024,132 (pp. 1-7).
Office Action dated Sep. 30, 2021 for U.S. Appl. No. 17/024,132 (pp. 1-13).

* cited by examiner

Primary Examiner — Maria El-Zoobi (74) Attorney, Agent, or Firm — Lee & Hayes, P.C.

(57) ABSTRACT

The present system and method uses a timer at a higher level, closer to the physical layer, to avoid software errors and the like from delaying messages and allowing the timer to expire inadvertently.

17 Claims, 6 Drawing Sheets

TIMER FOR EMERGENCY TEXT MESSAGES

CROSS-REFERENCE TO RELATED APPLICATIONS

This application is a continuation of U.S. application Ser. No. 17/024,132 filed on Sep. 17, 2020, entitled "IMPROVED TIMER FOR EMERGENCY TEXT MESSAGES", the entire contents of which are incorporated herein by reference.

BACKGROUND

Emergency messages have become an important tool to communicate critical messages to a broad audience in a quick and reliable manner. As users become more accustomed to emergency messages, it becomes more critical that the messages be successfully communicated. Current systems and methods use a timer to end communication of emergency messages if a message is not successfully communicated. However, the lack of success of communication of a message may be due to lower level problems like software errors which may result in an emergency message not being communicated.

SUMMARY

The present system and method uses a timer at a higher level, closer to the physical layer of a network, to avoid software errors and the like from delaying messages and allowing the timer to expire inadvertently. The timer at a higher level may be further removed from the software and related errors and will better enable an accurate assessment to be made whether a message has been delivered or if the message is not capable of being delivered.

BRIEF DESCRIPTION OF THE DRAWINGS

Persons of ordinary skill in the art may appreciate that elements in the figures are illustrated for simplicity and clarity so not all connections and options have been shown. For example, common but well-understood elements that are useful or necessary in a commercially feasible embodiment may often not be depicted in order to facilitate a less obstructed view of these various embodiments of the present disclosure. It may be further appreciated that certain actions and/or steps may be described or depicted in a particular order of occurrence while those skilled in the art may understand that such specificity with respect to sequence is not actually required. It may also be understood that the terms and expressions used herein may be defined with respect to their corresponding respective areas of inquiry and study except where specific meanings have otherwise been set forth herein.

DETAILED DESCRIPTION

In an example embodiment of the herein described methods and systems for generating and implementing emergency alert messages, an emergency alert message may be provided to mobile devices instead of the emergency alert message generated by the emergency alert initiator. In an example embodiment, the size (e.g., character length, number of bytes) of the alert message may be limited to conserve network resources and to accommodate limitations of mobile devices. For example, a limitation of 90 English characters for a text based alert message to wireless devices may be established. The alert messages are generated based upon attributes of the emergency alert message. In an example embodiment, the emergency alert messages may be generated based upon attributes of the protocol (e.g., the common alerting protocol, CAP) utilized to transmit the emergency alert message. Additionally, if the initiator of the emergency alert message is an authorized initiator, a free form alert message may be provided instead of, or in conjunction with, the predetermined emergency alert message.

Figure 1:
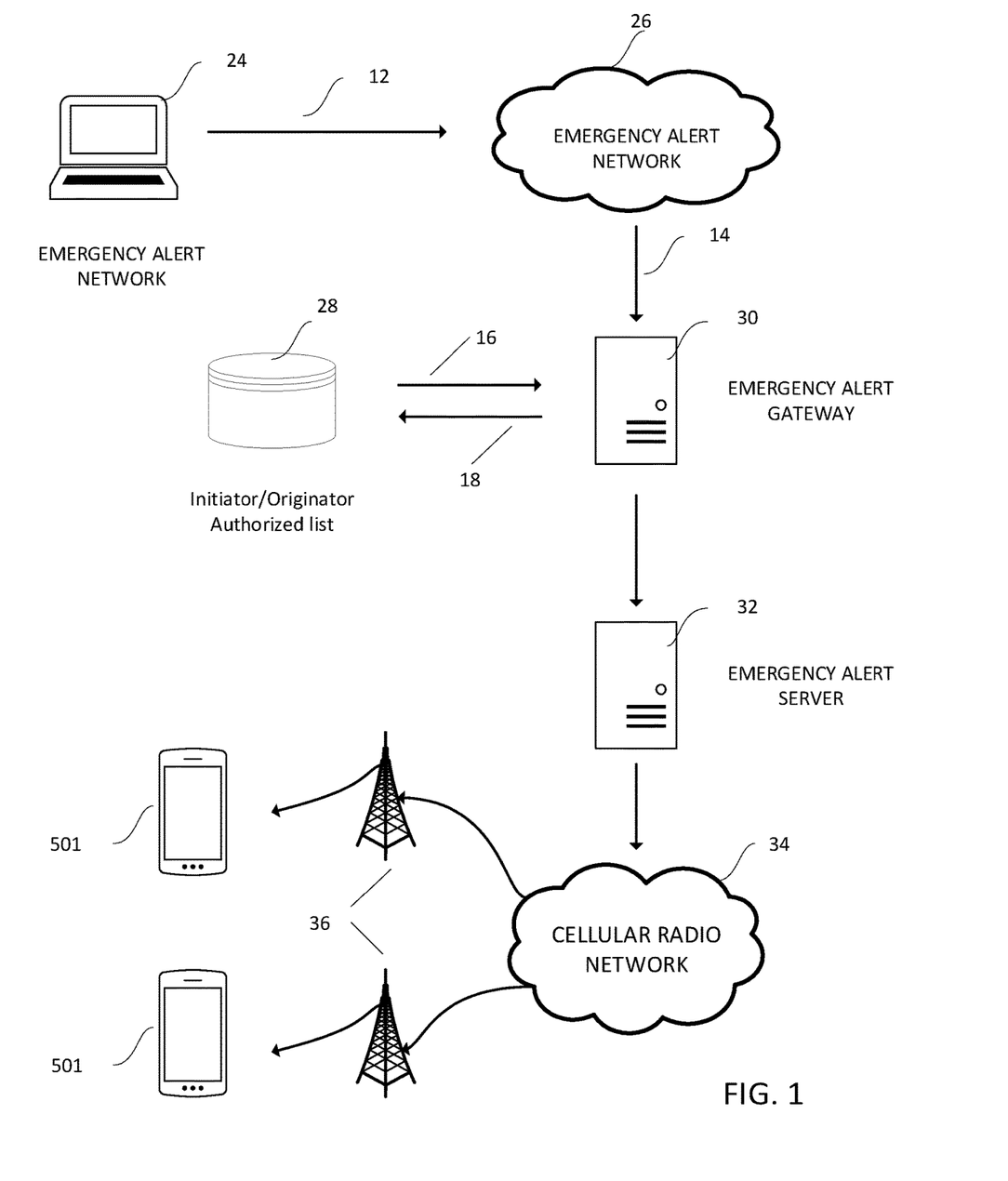
FIG. 1 may illustrate sample equipment in an emergency network.

FIG. 1 may be is a flow diagram of an example process and system for generating and distributing an emergency alert message. At step 12, an emergency alert message may be provided to the emergency alert network 26 by an emergency alert initiator 24. In an example embodiment, the emergency alert network 26 may be a network configured to accommodate Emergency Alert System (EAS) messages. The emergency alert initiator 24 may be any appropriate emergency alert initiator. For example, an emergency alert initiator 24 may be a government official, a member of a police department, an organization such as the National Weather Service, or the like. Thus, the emergency alert initiator 24 may be any of thousands of emergency alert initiators located throughout the United States and Canada.

When the emergency alert initiator 24 receives notification of an existing or pending emergency, the emergency alert initiator 24 may generate an emergency alert message formatted in conformance with a protocol for transmission to the emergency alert network 26. The transmission of the emergency alert message, at step 12, may be via a wired interface, a wireless interface, or a combination thereof. The protocol may include any appropriate protocol. In an example embodiment, the emergency alert message provided at step 12 may be formatted in accordance with the common alerting protocol (CAP). The common alerting protocol may be general format for exchanging all-hazard emergency alerts and public warnings over various wireless networks. A CAP alert message (an alert message formatted in accordance with the common alerting protocol), may include segments, or fields, indicative of various characteristics of emergency event. For example, the CAP comprises fields may be indicative of the sender of the emergency alert message, the type of event, the expiration of the event, the urgency of the event, the severity of the event, the certainty of the event, and the intended audience of the event. There may be other possible embodiments of the emergency alert. For example, the emergency alert may be a WEA text, EAS Text, IPAWS text, PUBLIC text, NWEM text, etc.

At step 14, the emergency alert message may be provided to a wireless emergency alert gateway 30. The transmission of the emergency alert message, at step 14, may be via a wired interface, a wireless interface, or a combination thereof. The emergency alert gateway 30 may include any appropriate processor, server, or the like. Upon receipt of the emergency alert message (at step 14), the emergency alert gateway 30 may analyze the received emergency alert message to generate, or select, a predetermined emergency alert message and to determine if the initiator/originator of the emergency alert message is an authorized emergency alert initiator/originator.

The emergency broadcast may originate from any authorized alert originator such as the National Weather Service (NWS) or United States Geological Survey (USGS), or federal, state, or local agency. At step 16, the authorized alert originator may be verified using a list in a database and the message may proceed if the verification is positive at step 18. The alert may include a presidential alert, an alert regarding imminent threats to safety or life (e.g., fires, wildfires, floods, hurricanes, earthquakes, natural disasters, etc.), child abduction (e.g., AMBER) alerts, and public safety alerts, for example. The broadcast may be a WEA 3.0 broadcast and may include at least the alert message, which may be limited to a specific number of alphanumeric characters (e.g., 360 characters), and geographical coordinates defining one or more geometric shapes (e.g., circle or polygon) describing the geographical boundaries of one or more alert areas associated with the wireless emergency alert. The alert area(s) may be defined as any geometric shape including circular and polygonal shapes. In some embodiments, the geometric shape of the alert area(s) may be limited to 10 geometric shapes with 1 to 100 total coordinates for all shapes, although this limit may vary depending on changing WEA regulations. The alert may proceed to an emergency alert server 32 where it may be communicated to the cellular radio network 34 where it is distributed to cellular tower 36 and then user devices 501.

At a more detailed level, proxies that determine the next hop of an emergency request based on location or local policy may need to keep track of MESSAGE requests it handles. On the other hand, proxies that forward MESSAGE requests based on the To header field or the Route header field do not need to keep track since the MESSAGE requests will be delivered consistently.

The proxies that need to track MESSAGE requests, e.g., the Emergency Services Routing Proxy [I D.ietf ecrit framework], may need to perform additional record keeping for MESSAGE requests if all of the following conditions are met.

The destination (obtained from the To header field) is urn:service:sos.

This is the first MESSAGE from a particular source (obtained from the From header field). In other words, the proxy has no record of the source sending a MESSAGE to urn:service:sos.

The record may be a (source, next-hop, expiration timer) triplet. The source may be obtained from the From header field of the request. The next-hop may be determined by a LoST query [RFC5222] based on the location information or a reference to the location information within the first request. Location information in subsequent requests may not affect the next-hop value. The expiration timer may be a value in seconds that will keep the record from expiring. Each subsequent request may reset the expiration timer. For example, if the configured value of the expiration timer is 30 seconds, then the countdown begins after the first request is processed. When the second request comes in, the expiration timer may be reset to 30 seconds and the countdown starts again. If the timer falls to zero, the record is no longer valid.

Proxies may route all subsequent MESSAGE request from the same source to the same next-hop while the expiration timer is greater than zero. Each subsequent MESSAGE request may reset the expiration timer to its maximum value. This is to ensure that a 'conversation' between the caller and the call taker is consistent.

During an active SIP call session, when a user mobile computing device fails to send a BYE message at the end of the session, or when the BYE message gets lost due to network problems, the proxy cannot determine when the session has ended. Therefore, the proxy may hold onto resources associated with the call session for indefinite periods of time causing the session to never time out.

A SIP session timer feature may add the capability to periodically refresh SIP sessions by sending repeated INVITE (re-INVITE) or UPDATE Session Refresh Requests. These requests may be sent during active call legs to allow user mobile computing devices or proxies to determine the status of a SIP session. The Session Refresh Requests along with the session timers may determine if the active sessions stay active and completed sessions are terminated.

When the session timer feature is in use, it may periodically send out a Session Refresh Request (re-INVITE or UPDATE). The Response that may be returned to the Session Border Controller may contain a success status code (2xx) that may contain a session timer interval. The Session Border Controller may then refresh the session timer each time it receives the 2xx Response containing that session timer interval.

The initial INVITE message sent from the user agent client (UAC) to the user agent server (UAS) contains two fields that make up the session timer interval in the SIP Session Header:

Session-Expires (SE)—Specifies the maximum amount of time, in seconds, that can occur between session refresh requests in a dialog before the session is considered timed out.

Minimum-SE (Min-SE)—Specifies the minimum allowed value, in seconds, for the session expiration.

If the Session Border Controller receives an INVITE from the UAC with a Session-Expires header, it may start a new session timer, or refreshes an existing session timer and then forwards the INVITE to the UAS. The subsequent 2xx Responses and re-INVITES also include the session timer intervals. If the Session Border Controller does not receive a session refresh within the time specified in the session timer interval, the session timer expires, and the Session Border Controller may terminate the session between the UAC and the UAS.

Figure 2:
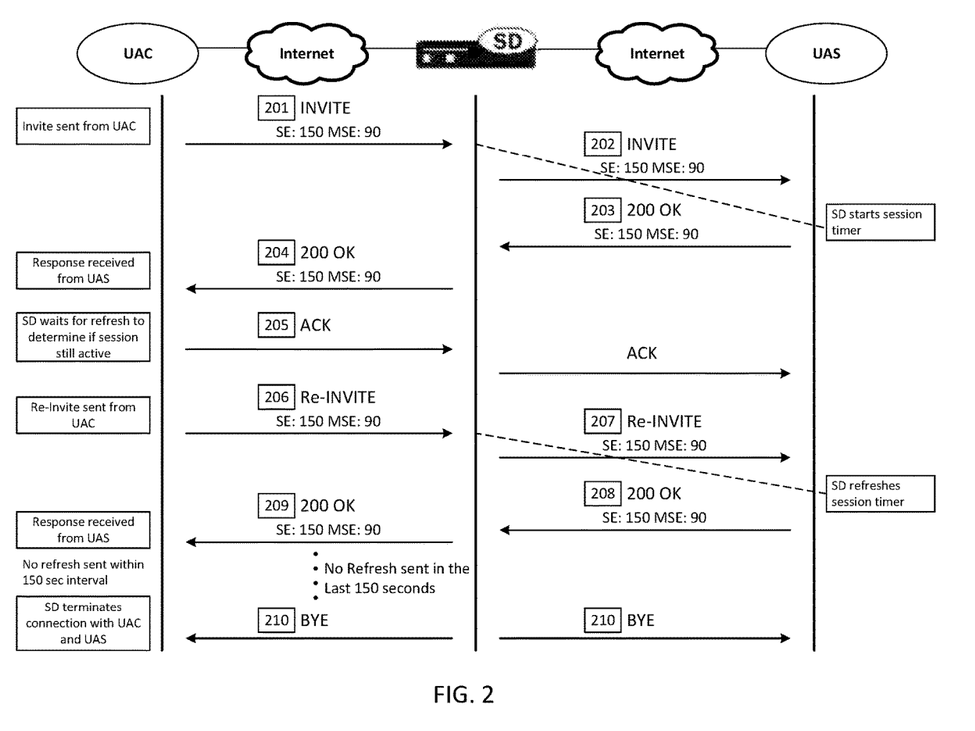
FIG. 2 may illustrate emergency set up flow.

The following may occurs when the session timer feature on is enabled in the Session Border Controller:

At block 201, the UAC may send an INVITE to the Session Border Controller with the SE and min-SE values (session timer interval). The Session Border Controller may start a session timer.

At block 202, the Session Border Controller may forward the INVITE to the User Agent Server (UAS) with the same values.

At block 203, the UAS may send the 200 OK Response to the Session Border Controller with the session interval values.

At block 204, the Session Border Controller may forward the Response to the UAC.

At block 205, the UAC may send an ACK (Acknowledge) to the Session Border Controller, and the Session Border Controller may forward the ACK to the UAS.

At block 206, the UAC may send out a re-INVITE (Session Refresh Request) to the Session Border Controller with the session interval values. The Session Border Controller may refresh the session timer.

At block 207, the Session Border Controller may forward the re-INVITE to the UAS.

At block 208, the UAS may send the 200 OK response to the Session Border Controller with the session interval values.

At block 209, the Session Border Controller may send the 200 OK response to the UAC.

At block 210, if the Session Border Controller does not receive a Response within the session interval (150 seconds in the following illustration), the timer may expire, and the Session Border Controller may terminates the session between the UAC and the UAS.

Figure 3:
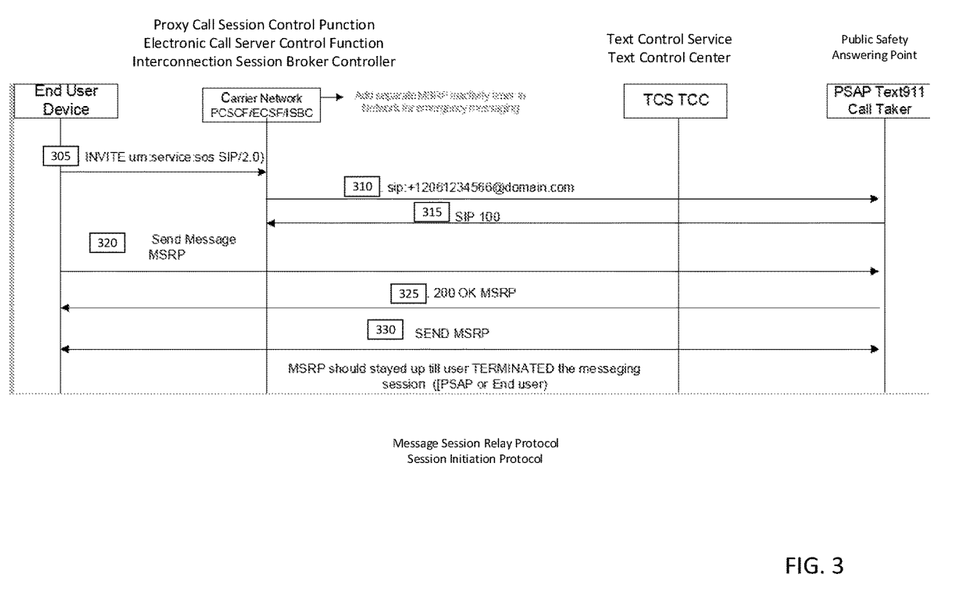
FIG. 3 may illustrate an abbreviated emergency set up flow.

The illustration in FIG. 3 may show an example of a dialog between the UAC, the Session Border Controller, and the UAS during an active session.

When the Session Border Controller terminates a session, it may send a BYE to both the ingress and egress call legs.

Currently, the timer may be set at the application layer. The technical problem is that time outs happen more frequently at the application layer as application layer issues may interfere with the timer or issues to reset or validate the timer. The technical solution is to move the timer to the network layer which has less software based issues than the application layer. The network layer is more concerned with the physical connections the data will traverse rather than the transmission protocols used to communicate the data as in the transport layer. By removing protocol based errors, less unintended time outs may occur. For example, by having the timer as a layer closer to the physical layer, application related errors may not interfere with the timer. For example, adding the timer to a switch, a bridge, a router, a hub or a repeater may remove application layer related errors.

Briefly, the OSI model breaks communication between nodes into seven layers. The lower layers may be related to physical connections such as cables and connections to enable communication to a network. The higher layers may execute applications and take the data to be communicated and format the data into protocols and data structures using appropriate error correction and security to allow the data to be reliably and efficiently communicated across a network.

FIG. 3 may be a simplified version of the flow. At block 305, an SIP request may be received from a mobile device to establish a text message session. At block 310, the SIP session may be initiated. At block 315, the SIP session may be set up. At block 320, an acknowledgement may be communicated to the emergency text server. At block 325, the emergency message session may be created, the emergency message may be received 330 and may stop up until the timer expires or a bye message is received.

Figure 4:
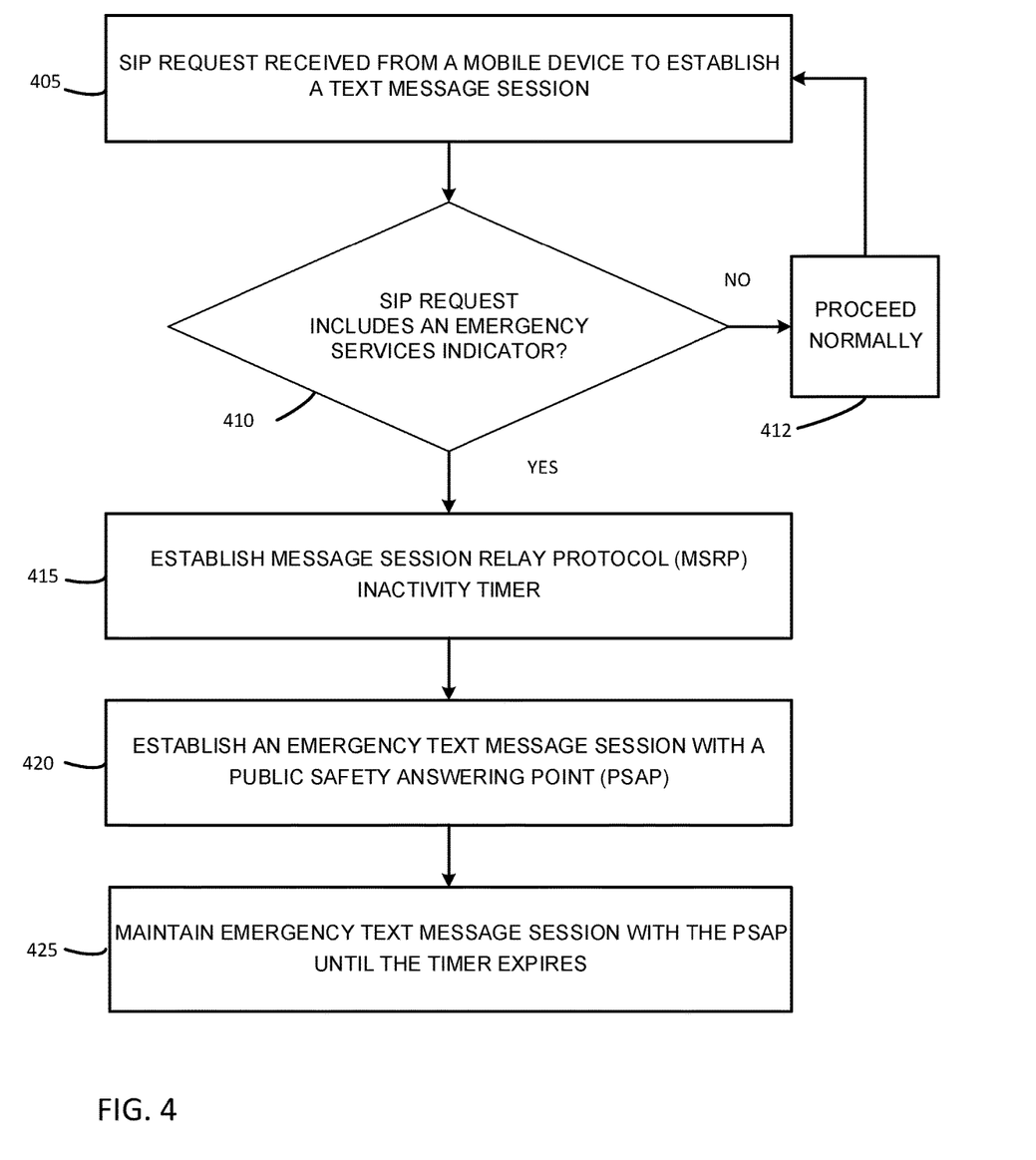
FIG. 4 may illustrate a flow to set up a timer.

Referring to FIG. 4, a computer-implemented method for improving emergency message reliability may be illustrated. At block 405, at a session interface protocol (SIP) proxy, an SIP request may be received from a mobile device to establish a text message session. The mobile device may be a cellular phone, a smart phone, a tablet, a laptop or any other device capable of wireless communication.

At block 410, the system and method may determine whether that the SIP request includes an emergency services indicator. The indicator may take on a variety of forms or values. In one embodiments, the indicator may follow a known protocol for efficiency and reliability. For example, the emergency service indicator may include an entry according to a communication protocol. As described in FIGS. 1 and 2, the emergency message may be handled and displayed in a variety of ways. If the determination at block 410 is no, control may pass to block 412 and the message may proceed normally. If the determination at block 410 is positive, control may pass to block 415.

At block 415, an extended message session relay protocol (MSRP) inactivity timer at the SIP proxy based may be established on the determination that the SIP request includes the emergency services indicator. The determination may be as simple as looking for a check in a data structure or protocol in the SIP request. For example, the SIP request may have a field for the emergency services indicator and the field may be blank or have a 0 if the SIP request is not an emergency and may have a 1 if the SIP request is an emergency.

In other embodiments, the emergency service indicator may be more complicated to avoid the misuse of the emergency service indicator. For example, a public private key exchange may be used to ensure that the emergency service indicator is legitimate and that the emergency system is not being misused. Other embodiments may use an emergency service indicator that changes with time or on a schedule that is known only to permitted users of the emergency system.

The inactivity timer may have a predetermined length. The length of the timer may be adjusted by an authority. For example, the authority may realize a longer timer may be needed for better and more reliable performance. In another embodiment, the timer may be adjusted by a user where the user realizes a timer of a different length may be appropriate. In other embodiments, machine learning may analyze past timer lengths and the resulting performance and may adjust the timer length based on the analysis of past timer lengths.

At block 420, in response to the SIP request, an emergency text message session with a public safety answering point (PSAP) may be established. Logically, the session may involve some security measures to ensure only legitimate emergency messages use the emergency message system. Some logical security measures include encryption and the exchange and use of private/public keys.

At block 425, the emergency text message session with the PSAP may be maintained until the extended MSRP inactivity timer expires. An advantage of moving the timer closer to the physical layer and further from the application layer is that problems in the application layer will not affect the timer or whether response are received and processed by the application layer. For example, a heartbeat from mobile device users may be mis-interpreted by an application in the application layer but the timer as a lower level my see the heartbeat response and may proceed with for application related errors.

Logically, the timer may reset if a termination response is received. The termination may be sent by the PSAP or by the user of the portable computing device. In some embodiments, an authority in addition to the PSAP may communicate a termination response. Again, the termination response may be a simple message created according to a protocol or may be a more complex message such as an encrypted message.

Logically, the emergency text message session with the PSAP may be taken down once a termination response has been received. Similarly, the emergency text message session with the public safety answering point may be taken down once the time expires on the timer. Similarly, the emergency text message session may remain up if a heartbeat signal is not received or when a response has not received and the timer has not run out.

The results of the system and method is a more reliable and trustworthy timer. In addition, there will be less errant take down of emergency sessions due to timer errors. As a result, emergency messages may be more reliable for receivers and senders may be more confident that emergency messages may be delivered successfully. In addition, emergency SIP sessions may be minimized as the system and method may have more confidence that the emergency message was successfully delivered.

Figure 5:
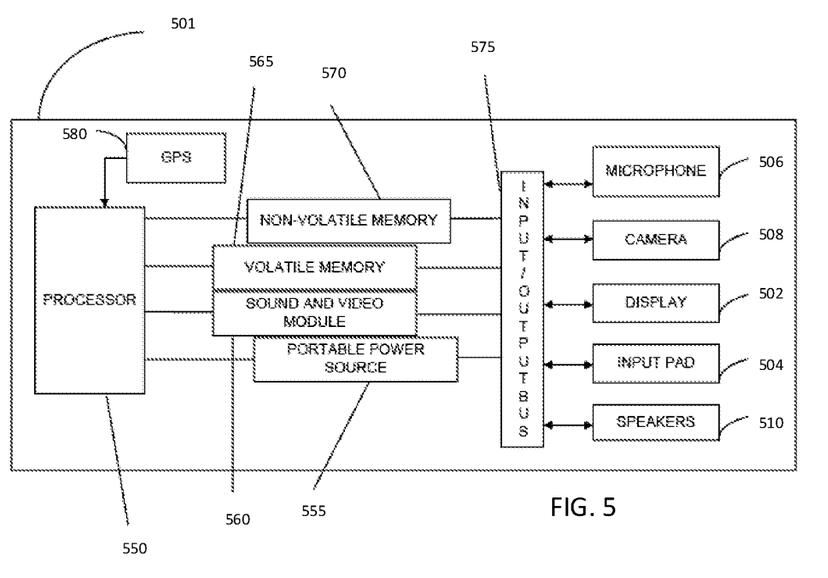
FIG. 5 may illustrate a sample portable computing device.

FIG. 5 may be a sample portable computing device 501 that is physically configured according to be part of the system. The portable computing device 501 may have a processor 550 that is physically configured according to computer executable instructions. It may have a portable power supply 555 such as a battery which may be rechargeable. It may also have a sound and video module 560 which assists in displaying video and sound and may turn off when not in use to conserve power and battery life. The portable computing device 501 may also have non-volatile memory 570 and volatile memory 565. The network or communication module 580 may have GPS, BLUETOOTH, NFC, cellular or other communication capabilities. In one embodiment, some or all of the network or communication capabilities may be separate circuits or may be part of the processor 550. There also may be an input/output bus 575 that shuttles data to and from the various user input devices such as the microphone 506, the camera 508 and other inputs, such as the input pad 504, the display 502, and the speakers 510, etc. It also may control communicating with the networks, either through wireless or wired devices. Of course, this is just one embodiment of the portable computing device 501 and the number and types of portable computing devices 501 is limited only by the imagination.

Figure 6:
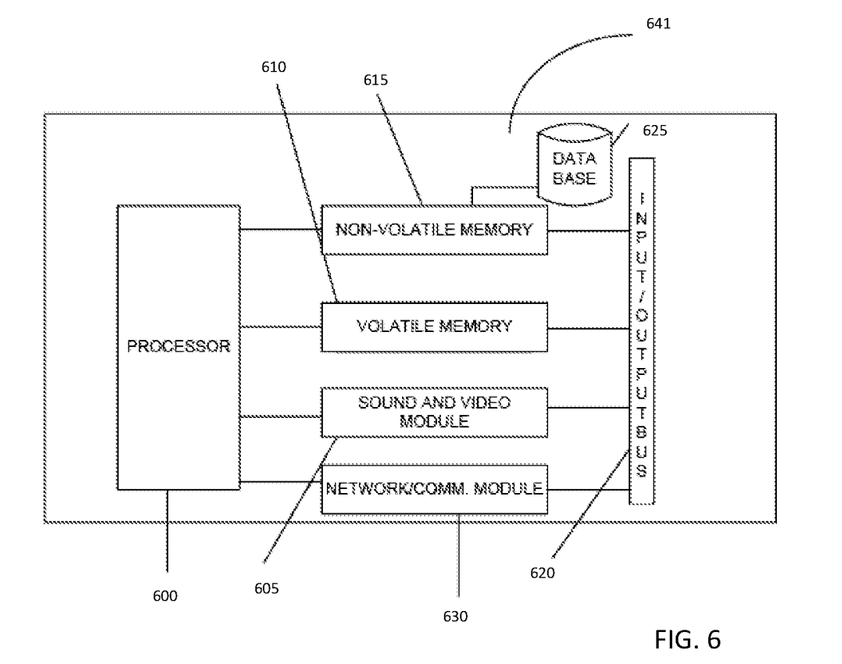
FIG. 6 may illustrate a sample server computing device.

The physical elements that make up the remote computing device 641 may be further illustrated in FIG. 6. At a high level, the computing device 641 may include a digital storage such as a magnetic disk, an optical disk, flash storage, non-volatile storage, etc. Structured data may be stored in the digital storage such as in a database. The server 641 may have a processor 600 that is physically configured according to computer executable instructions. It may also have a sound and video module 605 which assists in displaying video and sound and may turn off when not in use to conserve power and battery life. The server 641 may also have volatile memory 610 and non-volatile memory 615.

The database 625 may be stored in the memory 610 or 615 or may be separate. The database 625 may also be part of a cloud of computing device 641 and may be stored in a distributed manner across a plurality of computing devices 641. There also may be an input/output bus 620 that shuttles data to and from the various user input devices such as the microphone 506, the camera 508, the inputs such as the input pad 504, the display 502, and the speakers 510, etc. The input/output bus 620 may also connect to similar devices of the microphone 506, the camera 508, the inputs such as the input pad 504, the display 502, and the speakers 510, or other peripheral devices, etc. The input/output bus 620 also may interface with a network or communication module 630 to control communicating with other devices or computer networks, either through wireless or wired devices. In some embodiments, the application may be on the local computing device 501 and in other embodiments, the application may be remote 641. Of course, this is just one embodiment of the server 641 and the number and types of portable computing devices 641 is limited only by the imagination.

The user devices, computers and servers described herein (e.g., 501 or 641) may be computers that may have, among other elements, a microprocessor (such as from the Intel® Corporation, AMD®, ARM®, Qualcomm®, or MediaTek®); volatile and non-volatile memory; one or more mass storage devices (e.g., a hard drive); various user input devices, such as a mouse, a keyboard, or a microphone; and a video display system. The user devices, computers and servers described herein may be running on any one of many operating systems including, but not limited to WINDOWS®, UNIX®, LINUX®, MAC® OS®, iOS®, or Android®. It is contemplated, however, that any suitable operating system may be used for the present invention. The servers may be a cluster of web servers, which may each be LINUX® based and supported by a load balancer that decides which of the cluster of web servers should process a request based upon the current request-load of the available server(s).

The user devices, computers and servers described herein may communicate via networks, including the Internet, wide area network (WAN), local area network (LAN), Wi-Fi®, other computer networks (now known or invented in the future), and/or any combination of the foregoing. It should be understood by those of ordinary skill in the art having the present specification, drawings, and claims before them that networks may connect the various components over any combination of wired and wireless conduits, including copper, fiber optic, microwaves, and other forms of radio frequency, electrical and/or optical communication techniques. It should also be understood that any network may be connected to any other network in a different manner. The interconnections between computers and servers in system are examples. Any device described herein may communicate with any other device via one or more networks.

The example embodiments may include additional devices and networks beyond those shown. Further, the functionality described as being performed by one device may be distributed and performed by two or more devices. Multiple devices may also be combined into a single device, which may perform the functionality of the combined devices.

The various participants and elements described herein may operate one or more computer apparatuses to facilitate the functions described herein. Any of the elements in the above-described Figures, including any servers, user devices, or databases, may use any suitable number of subsystems to facilitate the functions described herein.

Any of the software components or functions described in this application, may be implemented as software code or computer readable instructions that may be executed by at least one processor using any suitable computer language such as, for example, Java, C++, or Perl using, for example, conventional or object-oriented techniques.

The software code may be stored as a series of instructions or commands on a non-transitory computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus and may be present on or within different computational apparatuses within a system or network.

It may be understood that the present invention as described above may be implemented in the form of control logic using computer software in a modular or integrated manner. Based on the disclosure and teachings provided herein, a person of ordinary skill in the art may know and appreciate other ways and/or methods to implement the present invention using hardware, software, or a combination of hardware and software.

The above description is illustrative and is not restrictive. Many variations of embodiments may become apparent to those skilled in the art upon review of the disclosure. The scope embodiments should, therefore, be determined not with reference to the above description, but instead should be determined with reference to the pending claims along with their full scope or equivalents.

One or more features from any embodiment may be combined with one or more features of any other embodiment without departing from the scope embodiments. A recitation of "a", "an" or "the" is intended to mean "one or more" unless specifically indicated to the contrary. Recitation of "and/or" is intended to represent the most inclusive sense of the term unless specifically indicated to the contrary.

One or more of the elements of the present system may be claimed as means for accomplishing a particular function. Where such means-plus-function elements are used to describe certain elements of a claimed system it may be understood by those of ordinary skill in the art having the present specification, figures and claims before them, that the corresponding structure includes a computer, processor, or microprocessor (as the case may be) programmed to perform the particularly recited function using functionality found in a computer after special programming and/or by implementing one or more algorithms to achieve the recited functionality as recited in the claims or steps described above. As would be understood by those of ordinary skill in the art that algorithm may be expressed within this disclosure as a mathematical formula, a flow chart, a narrative, and/or in any other manner that provides sufficient structure for those of ordinary skill in the art to implement the recited process and its equivalents.

While the present disclosure may be embodied in many different forms, the drawings and discussion are presented with the understanding that the present disclosure is an exemplification of the principles of one or more inventions and is not intended to limit any one embodiments to the embodiments illustrated.

The present disclosure provides a solution to the long-felt need described above. In particular, the systems and methods overcome challenges of relying on existing practices of emergency message delivery through a hardware solution. Further advantages and modifications of the above described system and method may readily occur to those skilled in the art.

The disclosure, in its broader aspects, is therefore not limited to the specific details, representative system and methods, and illustrative examples shown and described above. Various modifications and variations may be made to the above specification without departing from the scope or spirit of the present disclosure, and it is intended that the present disclosure covers all such modifications and variations provided they come within the scope of the following claims and their equivalents.

The invention claimed is:

1. A computer-implemented method comprising:
receiving, at a first network node, a request from a mobile device to establish a text message session, the request including an indicator;
based on the indicator, establishing a inactivity timer that is for a longer time period than a time period associated with another inactivity timer for another text message session established with another request that does not include the indicator;
in response to the request, establishing the text message session with a second network node; and
maintaining the text message session with the second network node until the inactivity timer expires,
wherein the text message session remains up when a response has not been received and the inactivity timer has not run out.

2. The computer implemented method of claim 1, wherein the inactivity timer is at a perimeter router.

3. The computer implemented method of claim 1, wherein the inactivity timer is at the first network node.

4. The computer-implemented method of claim 1, wherein the inactivity timer resets if a termination response is received.

5. The computer-implemented method of claim 1, wherein the indicator comprises an entry according to a communication protocol.

6. The computer-implemented method of claim 1, wherein the inactivity timer may be adjusted by an authority.

7. The computer-implemented method of claim 1 further comprising taking down the text message session with the second network node once a termination response has been received.

8. The computer-implemented method of claim 1 further comprising taking down the text message session with the second network node once the longer time period expires.

9. The computer-implemented method of claim 1, wherein the text message session remains up if a heartbeat signal is not received.

10. A computer system comprising:
an emergency service server for communicating emergency messages;
a portable computing device for receiving emergency messages;
the emergency service server comprising a processor, a memory and an input output circuit, the processor being physically configured according to computer executable instructions for
receiving, at a first network node, a request from a mobile device to establish a text message session, the request including a indicator;
based on the indicator, establishing an inactivity timer that is for a longer time period than a time period associated with another inactivity timer for another text message session established with another request that does not include the indicator;
in response to the request, establishing a text message session with a second network node;
maintaining the text message session with the second network node until the inactivity timer expires,
wherein the text message session remains up when a response has not been received and the inactivity timer has not run out or if a heartbeat signal is not received.

11. The computer system of claim 10, wherein the inactivity timer is at a perimeter router.

12. The computer system of claim 10, wherein the inactivity timer is at the first network node.

13. The computer system of claim 10, wherein if a termination response is received, the inactivity timer resets and the text message session with the second network node is taken down.

14. A non-transitory computer storage medium having programming instructions stored thereon that, when executed by a computing device, cause the computing device to perform operations comprising:
receiving, at a first network node, a request from a mobile device to establish a text message session, the request including a indicator;
based on the indicator, establishing an inactivity timer that is for a longer time period than a time period associated with another inactivity timer for another text message session established with another request that does not include the indicator;

in response to the request, establishing the text message session with a second network node; and maintaining the text message session with the second network node until the inactivity timer expires, wherein the text message session remains up when a response has not been received and the inactivity timer has not run out or if a heartbeat signal is not received.

15. The non-transitory computer storage medium of claim 14, wherein the inactivity timer is at a perimeter router.

16. The non-transitory computer storage medium of claim 14, wherein the inactivity timer is at the first network node.

17. The non-transitory computer storage medium of claim 14, wherein if a termination response is received, the inactivity timer resets and the text message session with the second network node is taken down.

\* \* \* \* \*